(12) United States Patent
Mou

(10) Patent No.: US 12,356,221 B2
(45) Date of Patent: Jul. 8, 2025

(54) METHOD AND APPARATUS FOR UPDATING SITE CONFIGURATION DATA, AND ELECTRONIC DEVICE

(71) Applicant: ZTE CORPORATION, Shenzhen (CN)

(72) Inventor: Dan Mou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 310 days.

(21) Appl. No.: 18/014,646

(22) PCT Filed: Mar. 24, 2021

(86) PCT No.: PCT/CN2021/082728
§ 371 (c)(1),
(2) Date: Jan. 5, 2023

(87) PCT Pub. No.: WO2021/218503
PCT Pub. Date: Nov. 4, 2021

(65) Prior Publication Data
US 2023/0276262 A1    Aug. 31, 2023

(30) Foreign Application Priority Data

Apr. 28, 2020  (CN) .......................... 202010351673.7

(51) Int. Cl.
*H04W 24/02* (2009.01)
*H04L 41/084* (2022.01)
(Continued)

(52) U.S. Cl.
CPC ........... *H04W 24/02* (2013.01); *H04L 41/084* (2013.01); *H04W 12/12* (2013.01); *H04L 41/12* (2013.01)

(58) Field of Classification Search
CPC ..... H04W 24/02; H04W 12/12; H04W 24/04; H04L 41/084; H04L 41/0233; H04L 41/12; H04L 41/145; H04L 41/082
See application file for complete search history.

(56) References Cited

U.S. PATENT DOCUMENTS 7,363,211 B1 * 4/2008 Naganathan ............ H04L 41/12
703/2
2004/0153536 A1 * 8/2004 Strassner ................ H04L 41/12
709/223

(Continued)

FOREIGN PATENT DOCUMENTS

CN      102611576 A     7/2012
CN      103139806 A     6/2013
(Continued)

OTHER PUBLICATIONS

International Search Report in Application No. PCT/CN2021/082728, dated Jun. 11, 2021, 4 pages, including translation.

*Primary Examiner* — Patrice L Winder
(74) *Attorney, Agent, or Firm* — Morgan, Lewis & Bockius LLP

(57) ABSTRACT

A method for updating configuration data of a site includes: parsing data of the site to obtain data information of the site according to a managed object (MO) model file of a network management system; parsing a physical device model of the site to obtain physical device information of the site according to a physical device model file of the network management system; determining an MO instance of the target physical device, an MO instance of a replaceable physical device below a level where the target physical device is located and an MO instance related to a service of the replaceable physical device according to a target physical device selected by a user, the data information of the site and the physical device information of the site; generating (Continued)

configuration data of the site; and updating the site by using the configuration data of the site.

15 Claims, 6 Drawing Sheets

(51) Int. Cl.
*H04W 12/12* (2021.01)
*H04L 41/12* (2022.01)

(56) References Cited

U.S. PATENT DOCUMENTS

| | | | |
|---|---|---|---|
| 2008/0294418 A1* | 11/2008 | Cleary | H04L 41/16 |
| | | | 715/764 |
| 2016/0055142 A1* | 2/2016 | Strassner | G06F 40/205 |
| | | | 707/755 |
| 2022/0271779 A1* | 8/2022 | Ma | H04L 41/22 |

FOREIGN PATENT DOCUMENTS

| | | | |
|---|---|---|---|
| CN | 105227337 A | 1/2016 | |
| WO | WO2014/042567 A1 | 3/2014 | |
| WO | WO-2020062097 A1 * | 4/2020 | G06F 16/182 |

\* cited by examiner

METHOD AND APPARATUS FOR UPDATING SITE CONFIGURATION DATA, AND ELECTRONIC DEVICE

CROSS REFERENCE TO RELATED APPLICATIONS

This is a National Stage Application filed under 35 U.S.C. 371, based on International Patent Application No. PCT/CN2021/082728 filed on Mar. 24, 2021, which claims priority to Chinese Patent Application No. 202010351673.7 filed with the China National Intellectual Property Administration (CNIPA) on Apr. 28, 2020, the disclosures of which are incorporated herein by reference in their entireties.

TECHNICAL FIELD

The present disclosure relates to the field of communication technology, for example, a method and apparatus for updating configuration data of a site and an electronic device.

BACKGROUND

To improve performance of a Long-Term Evolution (LTE) system of a wireless network, a communication device provider and a service provider continuously provide a base station and related device with better performance. Therefore, it is necessary to upgrade and reconstruct a site, replace an existing device with a new device and adjust a resource allocation of the site. For example, in a process that an LTE device is gradually replaced with a 5th-generation mobile communication system (5G) device, a workload of upgrading and reconstructing the site is increasing. Moreover, in a process of upgrading and reconstructing the site, not only configuration data of a physical device corresponding to the site needs to be updated, but also optimized transmission and wireless service data needs to be inherited.

Upgrading and reconstructing the site described above refers to upgrading and reconstructing the site on a network management side according to a process of reopening the site. For example, configuration data of the entire site is created on the network management side according to a new site type or device in a form of reopening the site, and a network parameter is optimized. Since the network parameter needs to take a certain amount of time to achieve an optimal effect, resulting in relatively poor user experience. Alternatively, new physical configuration data is artificially created on the network management side, and transmission and wireless service data is configured with reference to original configuration data. This artificial data configuration is inefficient and error-prone due to a large amount of data of the site and an association relationship between MOs.

SUMMARY

The present disclosure provides a method and apparatus for updating configuration data of a site and an electronic device.

A method for updating configuration data of a site is provided, which includes: parsing data of the site to obtain data information of the site according to a managed object (MO) model file of a network management system, where the data information of the site includes all MOs in the site and parent-child relationships and reference relationships between the all MOs; parsing a physical device model of the site to obtain physical device information of the site according to a physical device model file of the network management system, where the physical device information of the site includes all physical devices in the site, levels of the all physical devices and an MO instance of at least one physical device of the all physical devices at each level; determining an MO instance of the target physical device, an MO instance of a replaceable physical device below a level where the target physical device is located and an MO instance related to a service of the replaceable physical device according to a target physical device selected by a user, the data information of the site and the physical device information of the site; generating configuration data of the site according to the MO instance of the target physical device, the MO instance of the replaceable physical device below the level where the target physical device is located and the MO instance related to the service of the replaceable physical device; and updating the site by using the configuration data of the site.

An apparatus for updating configuration data of a site is further provided, which includes a first parsing module, a second parsing module, a physical device determination module, a configuration data generation module and a configuration data updating module. The first parsing module is configured to, according to a managed object (MO) model file of a network management system, parse data of the site to obtain data information of the site, wherein the data information of the site comprises all MOs in the site and parent-child relationships and reference relationships between the all MOs. The second parsing module is configured to, according to a physical device model file of the network management system, parse a physical device model of the site to obtain physical device information of the site, wherein the physical device information of the site comprises all physical devices in the site, levels of the all physical devices and an MO instance of at least one physical device of the all physical devices at each level. The physical device determination module is configured to, according to a target physical device selected from the all physical devices by a user, the data information of the site and the physical device information of the site, determine an MO instance of the target physical device, an MO instance of a replaceable physical device below a level where the target physical device is located and an MO instance related to a service of the replaceable physical device. The configuration data generation module is configured to generate configuration data of the site according to the MO instance of the target physical device, the MO instance of the replaceable physical device below the level where the target physical device is located and the MO instance related to the service of the replaceable physical device. The configuration data updating module is configured to update the site by using the configuration data of the site.

An electronic device is further provided, which includes one or more processors, a memory and one or more input/output (I/O) interfaces. The memory stores one or more programs, where the one or more programs, when executed by the one or more processors, cause the one or more processors to implement the above method for updating configuration data of a site. The one or more I/O interfaces are connected between the one or more processors and the memory and configured to implement an information interaction between the one or more processors and the memory.

A computer-readable medium is further provided, which stores a computer program, where the program, when executed by a processor, implements the above method for updating configuration data of a site.

DETAILED DESCRIPTION

Figure 1:
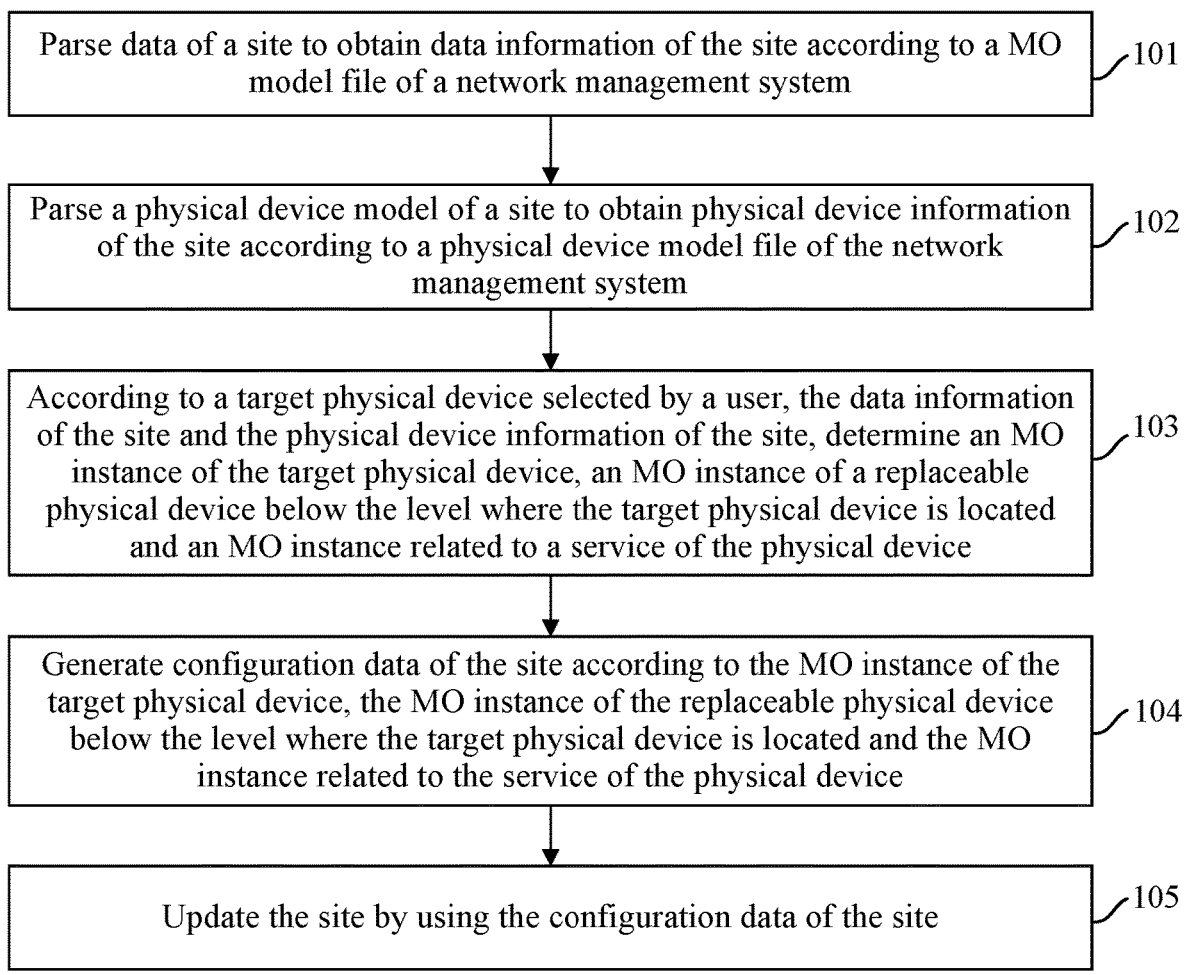
FIG. 1 is a flowchart of a method for updating configuration data of a site according to an embodiment of the present disclosure.

A method and apparatus for updating configuration data of a site, an electronic device and a computer-readable medium provided in the present disclosure are described below in conjunction with drawings.

Example embodiments are described hereinafter with reference to the drawings, but the example embodiments may be embodied in different forms and are not to be construed as limited to the embodiments set forth herein.

As used herein, the term "and/or" includes any and all combinations of one or more of the associated listed items.

Terms used herein are only used for describing embodiments and are not intended to limit the present disclosure. As used herein, the singular forms "one" and "the" are intended to include a plural form, unless otherwise specified in the context. The terms "include" and/or "made of" used herein specify the existence of the feature, entity, process, operation, element and/or component, without excluding the existence or addition of one or more other features, entities, processes, operations, elements, components and/or combinations thereof.

All the terms (including technical and scientific terms) used herein have the same meanings as commonly understood by those of ordinary skill in the art. Terms, such as those defined in commonly used dictionaries, are to be interpreted as having meanings consistent with their meanings in the context of the related art and the present disclosure and are not to be interpreted in an idealized or overly formal sense unless so defined herein.

A 3rd Generation Partnership Project (3GPP) protocol is a standard for a wireless communication technology, and a network management configuration describes a site through an MO. A modeling standard is given in the 3GPP protocol, and a manufacturer performs modeling extension according to the standard of the 3GPP. For a base station, an instance of a model is configuration data of the site, and the configuration data is a basis for an operation of the site.

In the modeling standard of the 3GPP, each network element node of the site includes a device child node, a transmission child node and a wireless child node, and below the level where each child node is located is a corresponding service child node thereto. The device child node, the transmission child node, the wireless child node and the service child node each describe one MO. The configuration data of the site consists of instances of these MOs.

A network management system manages multiple types of sites, and therefore, the network management system includes configuration data of different types of sites. The configuration data of the site includes an MO model file and a physical device model file, which are recorded in the network management system. The MO model file of the network management system contains multiple MOs and attributes thereof and parent-child relationships between the multiple MOs. For a transmission or wireless referenced physical device, the MO model file may also describe the referenced physical device. For example, an attribute in modeling MO is "related physical device MO", and a value in the modeling MO is a distinguished name (DN) of the referenced physical device.

The physical device model file is used for describing a site type of the site, a level relationship of multiple levels of physical devices supported by the site and an MO instance corresponding to a physical device at each level. The physical devices in each site are, from high to low, a base station, a cabinet, a rack, a frame, a slot, a single board and a service capability of the single board in sequence. A physical device node at each level has a corresponding MO. Although the level and the MO of the physical device are relatively fixed, multiple levels of physical devices of each site type have different MO instances.

When a user reconstructs the site, it is generally necessary to update an MO instance of a target physical device in the site, an instance of an MO referencing the target physical device and an MO instance related to a service of the target physical device, that is, to update configuration information of the site.

When the configuration information of the site is updated, the configuration information may be updated on a network element side or may be updated on a network management side. Compared with the network element side, the configuration information of the site is updated on the network management side so that a resource of the network management side can be effectively used and efficiency of producing the configuration information can be improved. Therefore, in the embodiments of the present disclosure, what is mainly introduced is that the configuration information of the site is generated on the network management side and the site is updated.

The embodiments of the present disclosure provide a method for updating configuration data of a site. FIG. 1 is a flowchart of a method for updating configuration data of a site according to an embodiment of the present disclosure. Referring to FIG. 1, the method for updating configuration data of the site includes the processes described below.

In 101, data of the site is parsed to obtain data information of the site according to a MO model file of a network management system.

The data information of the site includes all MOs in the site and parent-child relationships and reference relationships between the all MOs.

The MO model file of the network management system adopts, but is not limited to, files in Extensible Markup Language (XML), Excel and Yet Another Next Generation (YANG) format. The MO model file is stored in the network management system, and multiple MOs in the site, attributes of the multiple MOs and parent-child relationships and reference relationships between the multiple MOs can be obtained by using the MO model file. The attribute of MO includes information such as an MO name, a value type, a value range, a default value and whether there is a keyword.

The parent-child relationship of MO refers to a master-slave relationship between multiple MOs. For example, when a device root node MO includes a device child node MO, there is a parent-child relationship between the device root node MO and the device child node MO, where the device root node MO is a parent node MO, and the device child node MO is a child node MO.

The reference relationship of MO refers to a reference relationship between multiple MOs. For example, when a transmission child node MO references the device child node MO, there is a reference relationship between the transmission child node MO and the device child node MO.

In some embodiments, the data of the site is parsed according to the MO model file of the network management system, and the data of the site is divided into blocks to obtain MOs in each block and parent-child relationships between the MOs in each block.

Figure 2:
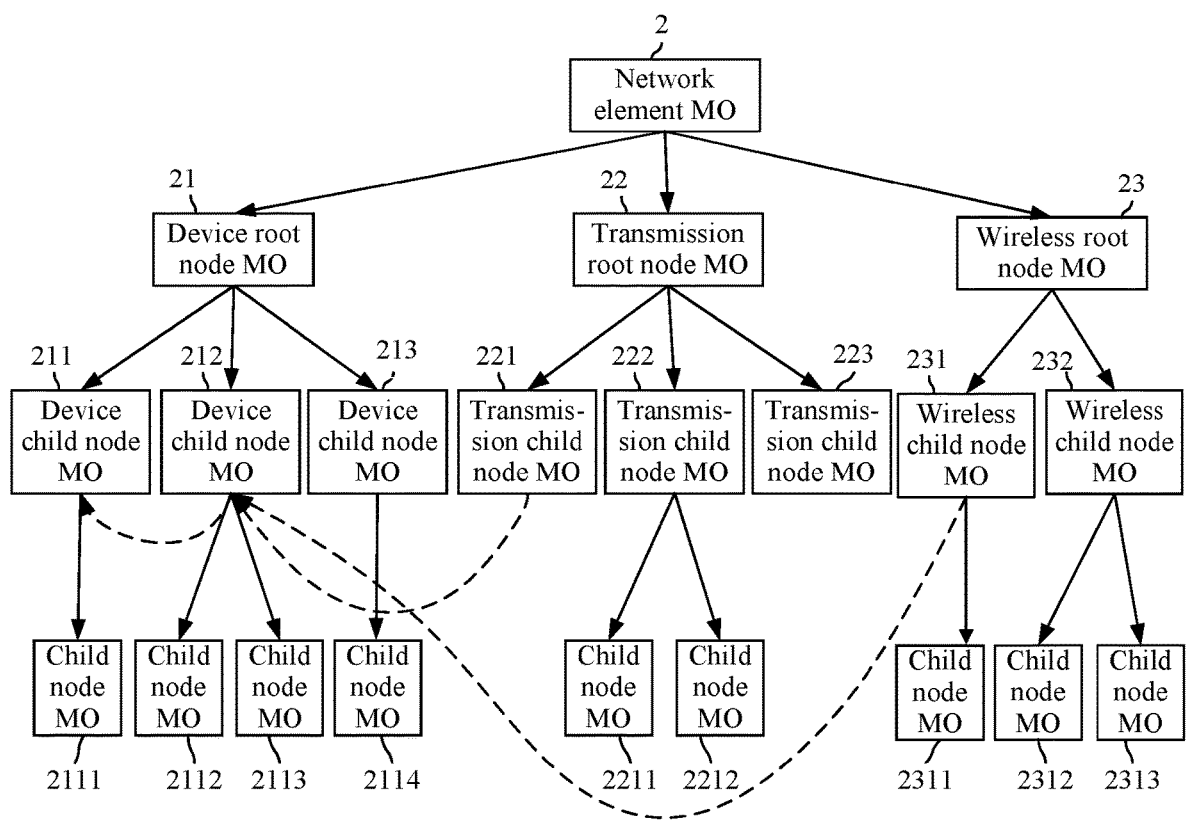
FIG. 2 is a relationship diagram of an MO model obtained through parsing data of a site according to an MO model file according to an embodiment of the present disclosure.

FIG. 2 is a relationship diagram of an MO model obtained through parsing data of the site according to an MO model file according to an embodiment of the present disclosure. As shown in FIG. 2, a network element MO 2 in the site is divided into three blocks, that is, a device root node MO 21, a transmission root node MO 22 and a wireless root node MO 23. There are multiple device child nodes MO 211, MO 212 and MO 213 below the level where the device root node MO 21 is located, and one or more child nodes may be further disposed below the level where each device child node is located, for example, child nodes MO 2111, MO 2112, MO 2113 and MO 2114 are disposed below the level where the device child nodes MO 211, MO 212 and MO 213 are located. There are multiple transmission child nodes MO 221, MO 222 and MO 223 below the level where the transmission root node MO 22 is located, and child nodes MO 2211 and MO 2212 may be further disposed below the level where the transmission child nodes MO 221, MO 222 and MO 223 are located. There are multiple wireless child nodes MO 231 and MO 232 below the level where the wireless root node MO 23 is located, and child nodes MO 2311, MO 2312 and MO 2313 may be further disposed below the level where the wireless child nodes MO 231 and MO 232 are located.

The device root node MO 21 and each of the device child nodes MO 211, MO 212 and MO 213 is in a parent-child relationship, the transmission root node MO 22 and each of the transmission child nodes MO 221, MO 222 and MO 223 is in a parent-child relationship, and the wireless root node MO 23 and each of the wireless child nodes MO 231, MO 232 and MO 233 is in a parent-child relationship.

When the data of the site is parsed to obtain the parent-child relationships between multiple MOs in the site according to the MO model file of the network management system, the parent-child relationships between the multiple MOs in the site may be stored according to a tree structure and displayed to the user.

In some embodiments, the data of the site is parsed to obtain a reference relationship description keyword according to the MO model file of the network management system, and an MO instance of a physical device referenced by an MO is obtained according to the reference relationship description keyword.

The reference relationship description keyword is a keyword used for describing the reference relationship of MO. An MO of the physical device referenced by the MO can be obtained according to the reference relationship description keyword, thereby obtaining the MO instance of the referenced physical device. For example, as shown by the dotted line in FIG. 2, it can be obtained according to the reference relationship description keyword that there is a reference relationship between the transmission child node MO 221 and the physical device child node MO 212, and the physical device child node MO 212 referenced by the transmission child node MO 221 and the physical device child node MO 211 referenced by the physical device child node MO 212 can be obtained.

In 102, a physical device model of a site is parsed according to a physical device model file of the network management system to obtain physical device information of the site.

The physical device information of the site includes all physical devices in the site, levels of the all physical devices and an MO instance of a physical device at each level.

The physical device model file of the network management system adopts, but is not limited to, files in XML, Excel and YANG format. The physical device model file of the network management system is used for describing a site type of the site, and the site supports a level relationship of multiple levels of physical devices and an MO instance corresponding to a physical device at each level.

In some embodiments, organization levels of multiple physical devices in the site are, from high to low, a base station, a cabinet, a rack, a frame, a slot, a single board and a service capability of the single board in sequence. A physical device node at each level has a corresponding MO, such as a base station MO, a cabinet MO, a rack MO, a frame MO, a slot MO, a single board MO or a service capability MO of the single board. When the physical device model of the site is parsed according to the physical device model file of the network management system to obtain the physical device information of the site, the physical device information of the site may be stored according to a tree structure and displayed to the user.

Although the level and the MO of the physical device are relatively fixed, multiple levels of physical devices in each of the multiple types of sites do not necessarily have the same MO instance.

In some embodiments, the physical device model of the site is parsed according to the physical device model file of the network management system so that the physical device information of the site can be obtained. The physical device information includes the levels of the physical devices in the site and the MO instance of the physical device at each level, that is, the all physical devices in the site, the level relationship of the all physical devices and the MO instance corresponding to the physical device at each level.

In some embodiments, the MO model file and the physical device model file of the network management system may be built into the network management system, and the data of the site and the physical device model of the site may be used as input signals.

In 103, according to a target physical device selected by a user, the data information of the site and the physical device information of the site, an MO instance of the target physical device, an MO instance of a replaceable physical device below the level where the target physical device is located and an MO instance related to a service of the physical device are determined.

In this embodiment, the parent-child relationships and the reference relationships between multiple MOs and the physical device information of the site are displayed in a tree structure, and the user may select the target physical device at an interface of the network management system according to a reconstruction of the site.

In some embodiments, a service type supported by multiple levels of physical devices below the level where the target physical device is located is determined level by level according to the target physical device selected by the user and the physical device information of the site; according to the service type supported by the physical device at each level, a type of the physical device at a corresponding level is determined; and the MO instance of the replaceable physical device below the level where the target physical device is located is determined according to the type of the physical device at each level.

For example, the network management system calculates a type of a replaceable physical device for each node. According to a type of a current physical device (at a current level), a type of a physical device of the same service type that the current physical device can support is calculated. The type and the service type of the current physical device may be in the MO model file or in the physical device model file. After the user selects the site type of the site, a selectable and replaceable cabinet type is a cabinet type having the same service function supported by the site. In other words, after the site type of the site is determined, the cabinet type of the site can be determined. After the cabinet type is selected, a user-selectable and replaceable rack is a rack type having the same service function supported by the cabinet, and so on, until a service of the single board at a bottommost level is determined. Therefore, after one level of physical devices is determined, types of multiple levels of physical devices below the level where the determined physical devices are located may be determined according to a type of the one level of physical devices, thereby determining a corresponding MO instance.

In this embodiment, the target physical device may be arbitrarily selected according to the reconstruction of the site, that is, one physical device in the site may be selected as the target physical device, and only the target physical device, multiple levels of physical devices below the level where the target physical device is located and related service data are updated, without updating configuration data of other physical devices other than the target physical device, thereby improving flexibility of the configuration data of the site and update efficiency.

In 104, configuration data of the site is generated according to the MO instance of the target physical device, the MO instance of the replaceable physical device below the level where the target physical device is located and the MO instance related to the service of the physical device.

In some embodiments, according to the configuration data of the site, the MO instance of the target physical device is created or replaced, an MO instance of a referenced physical device below the level where the target physical device is located is replaced, and an MO instance related to a service of the physical device is updated.

In some embodiments, a service MO instance of the physical device is updated, an MO of the referenced physical device is acquired, and an attribute value of the MO of the referenced physical device is updated.

In this embodiment, the configuration data of the site is generated by the MO instance of the target physical device, the MO instance of the replaceable physical device below the level where the target physical device is located and the MO instance related to the service of the physical device.

In 105, the site is updated by using the configuration data of the site.

In 105, MO instances of physical devices at corresponding levels are replaced by using the configuration data of the site; MOs referencing these physical devices are searched, and "related attribute" values of the MOs are updated to distinguished names of MO instances of new physical devices; and the MO instances of the changed physical devices are transmitted into an expansion interface, and the interface is called to complete an update of corresponding service MO instances.

Figure 3:
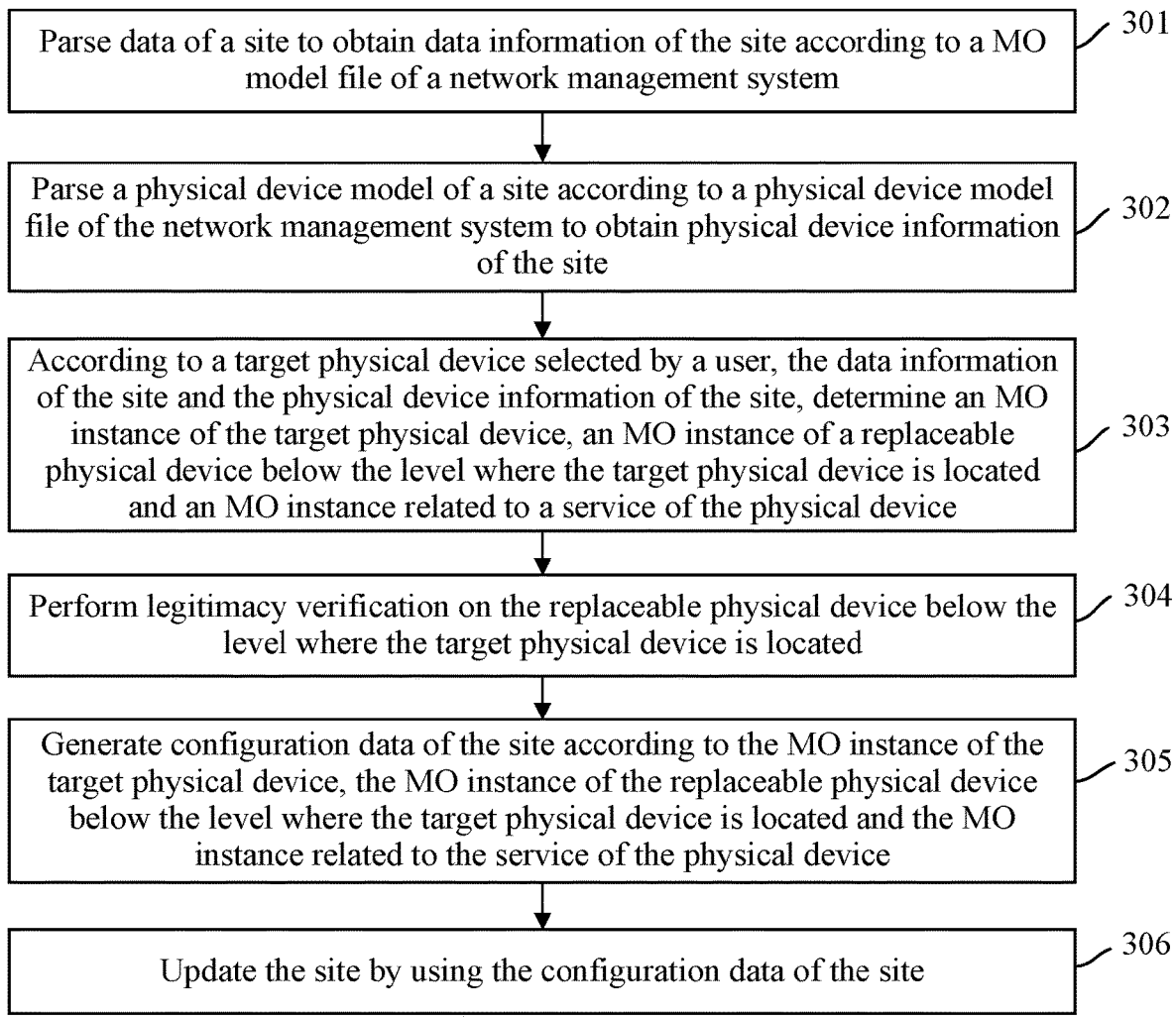
FIG. 3 is a flowchart of another method for updating configuration data of a site according to an embodiment of the present disclosure.

FIG. 3 is a flowchart of another method for updating configuration data of the site according to an embodiment of the present disclosure. Referring to FIG. 3, the method for updating configuration data of the site includes the processes described below.

In 301, data of the site is parsed to obtain data information of the site according to a MO model file of a network management system.

The data information of the site includes all MOs in the site and parent-child relationships and reference relationships between the all MOs.

In 302, a physical device model of a site is parsed according to a physical device model file of the network management system to obtain physical device information of the site.

The physical device information of the site includes all physical devices in the site, levels of the all physical devices and an MO instance of a physical device at each level.

In 303, according to a target physical device selected by a user, the data information of the site and the physical device information of the site, an MO instance of the target physical device, an MO instance of a replaceable physical device below the level where the target physical device is located and an MO instance related to a service of the physical device are determined.

In this embodiment, 301 to 303 are the same as 101 to 103 in the preceding embodiment, which are not repeated here.

In 304, legitimacy verification is performed on the replaceable physical device below the level where the target physical device is located.

In some embodiments, types, service types and the number of instances of multiple levels of physical devices below the level where the target physical device is located are verified in sequence to determine the legitimacy of the target physical device.

The network management system acquires an MO instance of a target physical device at each level according to a selection of the user. The legitimacy verification may start from a site type of the site. A process of the verification includes: verifying whether each cabinet type in the site is a creatable cabinet type, checking whether a service type of the cabinet (such as a main cabinet, a secondary cabinet or an auxiliary cabinet) is the same as a service type of a cabinet before replacement, and checking whether the number of cabinet instances supported by the site is greater than or equal to the number of cabinet instances configured in the site. For example, assuming that there are two secondary cabinets in the site, and if a support capability of an updated site type is greater than or equal to that of the two secondary cabinets, the verification is successful. When the cabinet is successfully verified, a physical device at a next level continues to be verified, that is, a rack is verified. A verification content of the rack is the same as that of the cabinet, which is also performed according to a rack type, a service type of the rack and the number of racks supported by the cabinet until a last level of the site is traversed, that is, a service MO instance of a single board. When the service MO instance of the single board is verified, a type of the single board is determined, whether an MO instance of the single board is a service MO supported by the single board is determined, and whether the number of service MO instances of the single board can be greater than or equal to the number of service MO instances of a single board corresponding to the site.

When the physical device below the next level of the target physical device is not replaced, the original physical device continues to be used.

When the replaceable physical device below the level where the target physical device is located is successfully verified, 305 is performed. When the replaceable physical device below the level where the target physical device is located fails to be verified, the network management system may guide the user to replace the target physical device. For example, the network management system may recommend a suitable target physical device to the user. The network management system may also guide the user to modify the data of the site.

In 305, configuration data of the site is generated according to the MO instance of the target physical device, the MO instance of the replaceable physical device below the level where the target physical device is located and the MO instance related to the service of the physical device.

In this embodiment, 305 is the same as 104 in the preceding embodiment, which is not repeated here.

In 306, the site is updated by using the configuration data of the site.

In 306, the MO instance of the physical device may be updated level by level. For example, a MO instance and a service MO instance of the cabinet are updated, and MO instances and service MO instances of physical devices at different levels are updated downward level by level. The service MO of the single board is a description of a capability of the single board, that is, for a determined single board, the number of services and MO instances supported by the single board is determined. Therefore, after the single board is replaced, the service MO instance of the single board replaces the service MO instance of the single board of the site. Next, MOs referencing these physical devices are searched, and "related physical device MO" attribute values of the MOs are updated to DN values of MO instances of new physical devices. Finally, the service MO instances of the changed physical devices are transmitted into an expansion interface, and the expansion interface is called to complete an update of corresponding service MO instances of physical devices.

When the service MO instance of the replaced physical device is more than the service MO instance of the physical device corresponding to the site, one service MO instance may be created. For example, when the service MO instance of the replaced single board is more than the service MO instance of the single board of the site, one service MO instance of the single board may be created.

To understand the method for updating configuration data of the site provided in the embodiments of the present disclosure, a method for updating configuration data of the site is described below.

Figure 4:
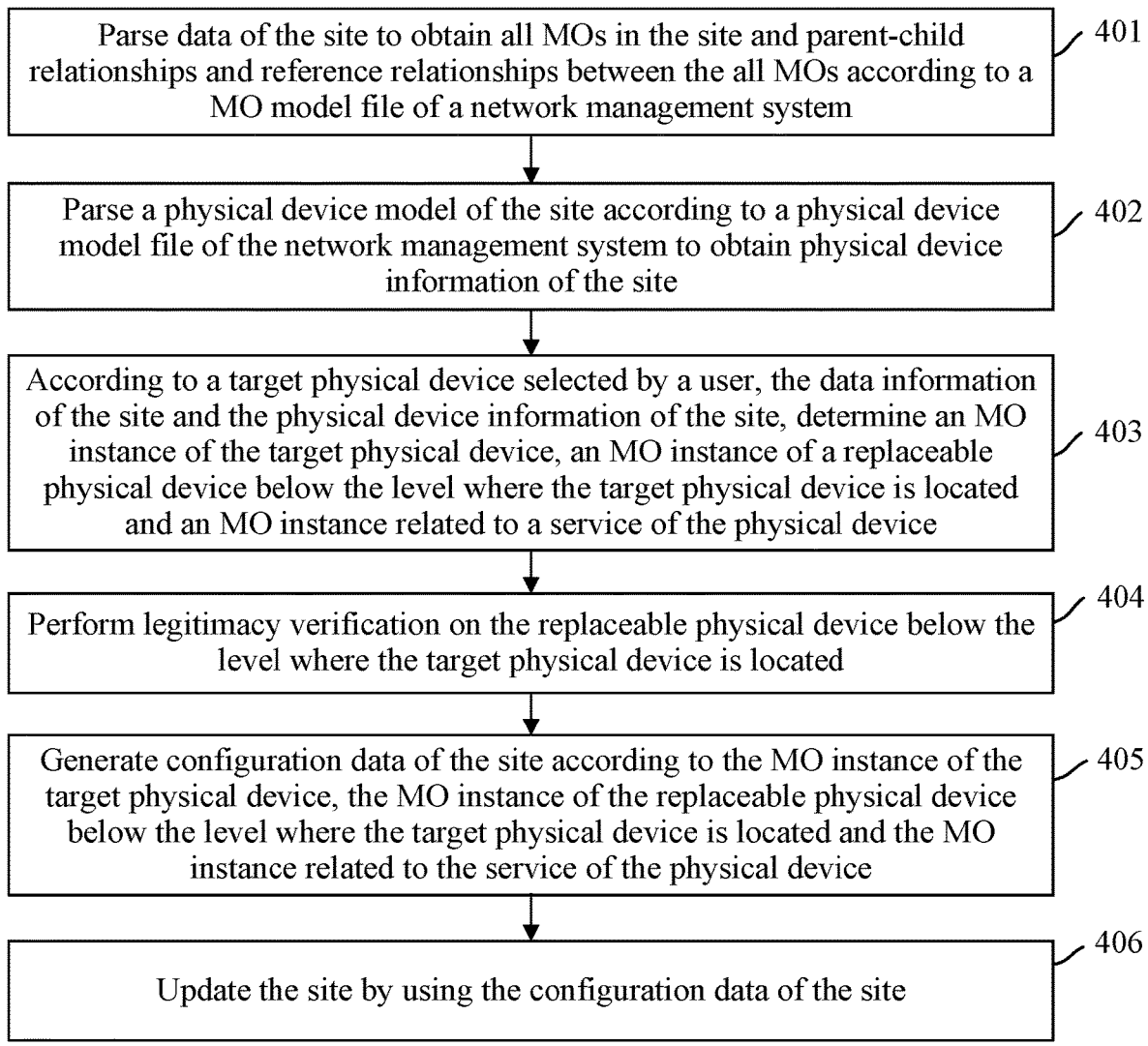
FIG. 4 is a flowchart of another method for updating configuration data of a site according to an embodiment of the present disclosure.

FIG. 4 is a flowchart of another method for updating configuration data of the site according to an embodiment of the present disclosure. As shown in FIG. 4, the method for updating configuration data of the site includes the processes described below.

In 401, data of the site is parsed to obtain data information of the site according to a MO model file of a network management system.

The data information of the site includes all MOs in the site and parent-child relationships and reference relationships between the all MOs.

In this embodiment, the MO model file of the network management system is a file in Excel format. In the MO model file of the network management system, an MO name and an attribute name of the MO are listed in rows, and descriptions of the MO and the attribute of the MO are listed in columns, including information such as a parent MO name, a value type, a value range, a default value and whether there is a keyword.

When the network management system starts up, the MO model file is loaded, data of the site input by a user is parsed, the data of the site is divided into blocks according to a device MO instance, a transmission MO instance and a wireless MO instance, and an MO instance of each block is stored according to a tree structure. Moreover, an instance of an MO referencing a physical device is searched according to a reference relationship description keyword to acquire an MO instance of the referenced physical device. The MO instance of the referenced physical device may be stored in the physical, transmission and wireless MO instances.

In 402, a physical device model of a site is parsed according to a physical device model file of the network management system to obtain physical device information of the site.

The physical device model file is described using a file in Excel format. The physical device model file is used for describing a site type, a level relationship of multiple levels of physical devices and an MO instance corresponding to a physical device at each level.

In this embodiment, a base station, a cabinet, a rack, a frame, a slot and a single board may each be described using a separate page. In each page, the MO instance of the physical device is listed in rows, an attribute of MO of the physical device and a type of a child device of the physical device are listed in columns, and the type of the child device supported by the physical device is filled in a last column. For example, on a page of the single board, an attribute of MO of the single board and a service capability attribute of the single board are contained in columns, and an MO instance of the single board and an MO instance of the service capability supported by the single board are listed in rows.

After the network management system starts up, the physical device model file of the site is loaded and parsed to obtain MO instances of all physical devices actually configured in the site, levels of the physical devices and the MO instance of the physical device at each level.

After 401 and 402 are completed, in the site obtained through the parsing, the all MOs, the parent-child relationships and the reference relationships between the all MOs, the MO instances of the all physical devices, the levels of the physical devices and the MO instance of the physical device at each level may be presented by the network management system to the user for the user to select an MO instance of a replaceable physical device.

In 403, according to a target physical device selected by a user, the data information of the site and the physical device information of the site, an MO instance of the target physical device, an MO instance of a replaceable physical device below the level where the target physical device is located and an MO instance related to a service of the physical device are determined.

The network management system presents the physical device at each level of the site and the corresponding MO instance to the user according to a tree structure. For example, at a user interface, tree nodes at different levels in the tree structure represent physical devices at different levels, and when the user clicks on the tree nodes, an MO instance of a physical device corresponding to each tree node is presented in the form of a table. According to the MO instance of the physical device supported by the physical device at each level, the user can learn a type of the replaceable physical device.

In 403, after the user selects the target physical device, the type of the replaceable physical device and the MO instance of the replaceable physical device below the level where the target physical device is located can be known at a tree node corresponding to the target physical device.

In 403, the network management system may also obtain an instance of an MO referencing the physical device according to a related attribute of the physical device.

In 404, legitimacy verification is performed on the replaceable physical device below the level where the target physical device is located.

According to the target physical device selected by the user, the network management system integrates levels of replaced physical devices in the site, obtains the type and MO instance of the physical device at each level and performs the legitimacy verification: the verification starts from the device root node (the site type) and the network management system verifies whether a type of a first-level child node in the site is a type of a child device that is creatable in the site; next, the network management system verifies whether a service type of the child device is the same as that of an original device before the replacement; third, the network management system verifies whether the number of instances of the child device is greater than or equal to the number of instances of a device at a level corresponding to an original site; if the verification is successful, the verification is performed on a next level until a service capability MO of the last-level single board is traversed.

For example, the verification verifies whether multiple cabinet types in the site are creatable cabinet types, verifies whether a service type of a cabinet (such as a main cabinet, a secondary cabinet or an auxiliary cabinet) is the same as a service type of a cabinet before the replacement, and verifies whether the number of cabinet instances supported by the site is greater than or equal to the number of cabinet instances configured in the site. For example, assuming that there are two secondary cabinets in the site, and if a support capability of an updated site type is greater than or equal to that of the two secondary cabinets, the verification is successful. When the cabinet is successfully verified, the next-level physical device continues to be verified, that is, a rack is verified. A verification content of the rack is the same as that of the cabinet, which is also performed according to a rack type, a service type of the rack and the number of racks supported by the cabinet until the last level of the site is traversed, that is, a service MO instance of the single board.

For a physical device fails to be verified, the network management system may give an explicit prompt to guide the user to replace the target physical device or modify data of the original site.

In 405, configuration data of the site is generated according to the MO instance of the target physical device, the MO instance of the replaceable physical device below the level where the target physical device is located and the MO instance related to the service of the physical device.

In 406, the site is updated by using the configuration data of the site.

Original configuration data of the site is updated by using the configuration data, the MO instances of the physical devices are updated, MOs of the physical devices are searched, related attribute values are updated to DNs of MO instances of new physical devices, the MO instances of the updated physical devices are transmitted into an expansion interface, and when the expansion interface is called, an update of corresponding service MO instances is completed, thereby completing the update of the configuration data of the site.

Although the MO model file in Excel format is used as an example in this embodiment to describe the generation and update of the configuration data of the site, the present disclosure is not limited thereto. An MO model file in another format can also update the configuration data of the site according to the method provided in this embodiment, and the same technical effect can be obtained.

In the method for updating configuration data of the site provided in the embodiments of the present disclosure, the data of the site is parsed according to the MO model file of the network management system to obtain parent-child relationships and reference relationships between multiple MOs of the site; the physical device model of the site is parsed according to the physical device model file of the network management system to obtain the physical device information of the site; according to the target physical device selected by the user and the physical device information of the site, the MO instance of the replaceable physical device below the level where the target physical device is located is determined; the configuration data of the site is generated according to the MO instance of the target physical device, the MO instance of the replaceable physical device below the level where the target physical device is located and the MO instance related to the service of the physical device; the site is updated by using the configuration data of the site so that the user updates the configuration data of the site on a network management side in conjunction with the target physical device desired by the user, and the updated configuration data includes both physical device data and service data, thereby improving universality of the updated configuration data of the site and user experience. In addition, multiple types and multiple levels of physical devices can be replaced through the method for updating configuration data of the site provided in this embodiment so that the user can flexibly select the replaceable target physical device, thereby achieving an effect that the multiple types of physical devices are replaced by using one system, which has high configuration efficiency and is not prone to error.

Figure 5:
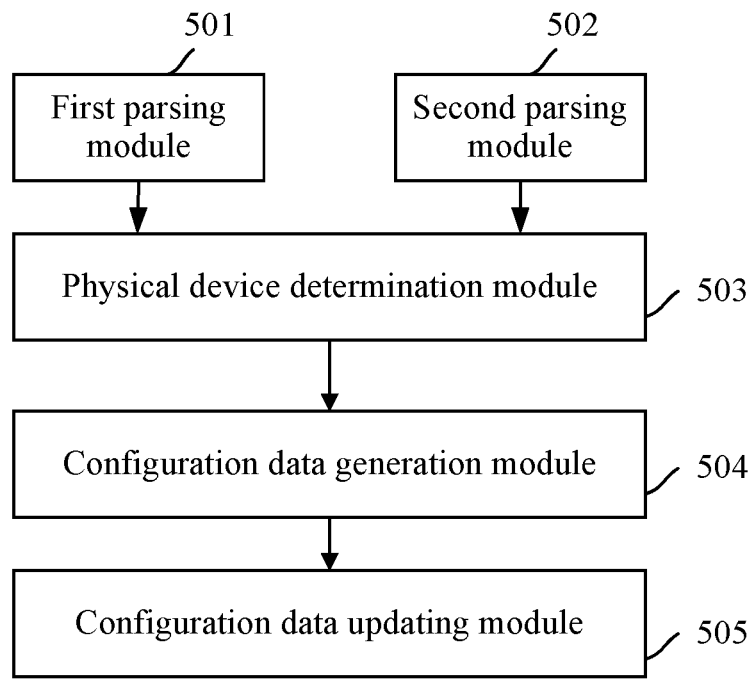
FIG. 5 is a schematic diagram of an apparatus for updating configuration data of a site according to an embodiment of the present disclosure.

The embodiments of the present disclosure provide an apparatus for updating configuration data of the site. FIG. 5 is a schematic diagram of an apparatus for updating configuration data of the site according to an embodiment of the present disclosure. Referring to FIG. 5, the apparatus for updating configuration data of the site provided in the embodiments of the present disclosure includes a first parsing module 501, a second parsing module 502, a physical device determination module 503, a configuration data generation module 504 and a configuration data updating module 505.

The first parsing module 501 is configured to parse data of the site to obtain data information of the site according to an MO model file of a network management system. The data information of the site includes all MOs in the site and parent-child relationships and reference relationships between the all MOs.

A specific implementation of the first parsing module 501 is the same as that of 101 in the preceding embodiment, which is not repeated here.

The second parsing module 502 is configured to parse a physical device model of a site according to a physical device model file of the network management system to obtain physical device information of the site. The physical device information of the site includes all physical devices in the site, levels of the all physical devices and an MO instance of a physical device at each level.

A specific implementation of the second parsing module 502 is the same as that of 102 in the preceding embodiment, which is not repeated here.

The physical device determination module 503 is configured to determine, according to a target physical device selected by a user, the data information of the site and the physical device information of the site, an MO instance of the target physical device, an MO instance of a replaceable physical device below the level where the target physical device is located and an MO instance related to a service of the physical device.

A specific implementation of the physical device determination module 503 is the same as that of 103 in the preceding embodiment, which is not repeated here.

The configuration data generation module 504 is configured to generate configuration data of the site according to the MO instance of the target physical device, the MO instance of the replaceable physical device below the level where the target physical device is located and the MO instance related to the service of the physical device.

A specific implementation of the configuration data generation module 504 is the same as that of 104 in the preceding embodiment, which is not repeated here.

The configuration data updating module 505 is configured to update the site by using the configuration data of the site.

Figure 6:
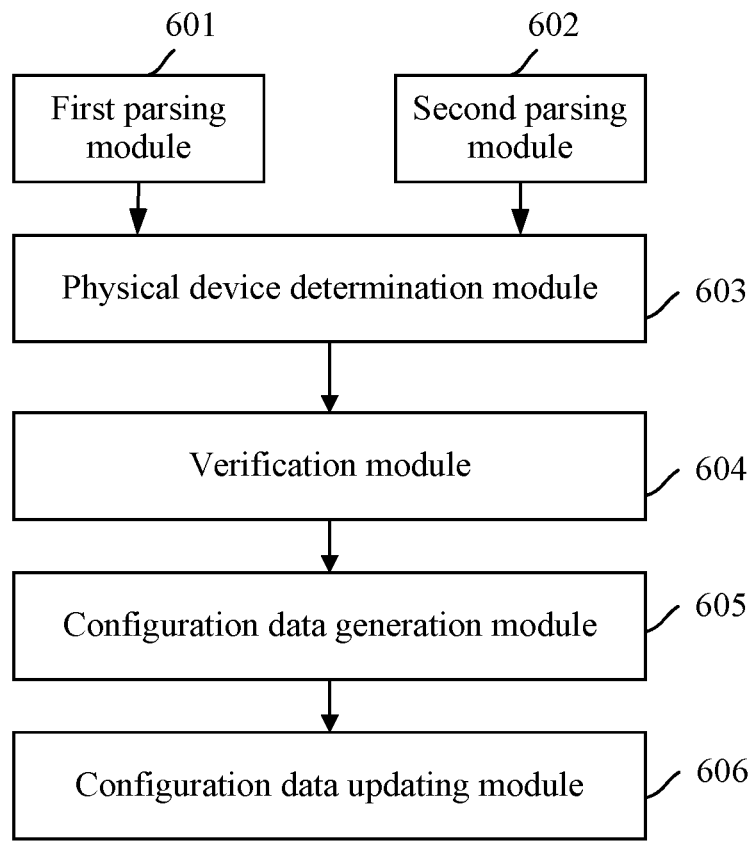
FIG. 6 is a schematic diagram of another apparatus for updating configuration data of a site according to an embodiment of the present disclosure.

FIG. 6 is a schematic diagram of another apparatus for updating configuration data of the site according to an embodiment of the present disclosure. Referring to FIG. 6, the apparatus for updating configuration data of a site provided in the embodiments of the present disclosure includes a first parsing module 601, a second parsing module 602, a physical device determination module 603, a verification module 604, a configuration data generation module 605 and a configuration data updating module 606.

The first parsing module 601 is configured to parse data of the site according to an MO model file of a network management system to obtain data information of the site. The data information of the site includes all MOs in the site and parent-child relationships and reference relationships between the all MOs.

The second parsing module 602 is configured to parse a physical device model of a site according to a physical device model file of the network management system to obtain physical device information of the site.

The physical device determination module 603 is configured to determine, according to a target physical device selected by a user, the data information of the site and the physical device information of the site, an MO instance of the target physical device, an MO instance of a replaceable physical device below the level where the target physical device is located and an MO instance related to a service of the physical device.

The verification module 604 is configured to perform legitimacy verification on the replaceable physical device below the level where the target physical device is located.

In some embodiments, types, service types and the number of instances of multiple levels of physical devices below the level where the target physical device is located are verified in sequence to determine the legitimacy of the target physical device.

The configuration data generation module 605 is configured to generate configuration data of the site according to the MO instance of the target physical device, the MO instance of the replaceable physical device below the level where the target physical device is located and the MO instance related to the service of the physical device.

The configuration data updating module 606 is configured to update the site by using the configuration data of the site.

In the apparatus for updating configuration data of the site provided in the embodiments of the present disclosure, the user can update the configuration data of the site on a network management side in conjunction with the target physical device desired by the user, and the updated configuration data includes both physical device data and service data, thereby improving universality of the updated configuration data of the site and user experience. In addition, multiple types and multiple levels of physical devices can be replaced through the apparatus for updating the configuration data of the site provided in this embodiment so that the user can flexibly select the replaceable target physical device, thereby achieving an effect that the multiple types of physical devices are replaced by using one system, which has high configuration efficiency and is not prone to error.

Figure 7:
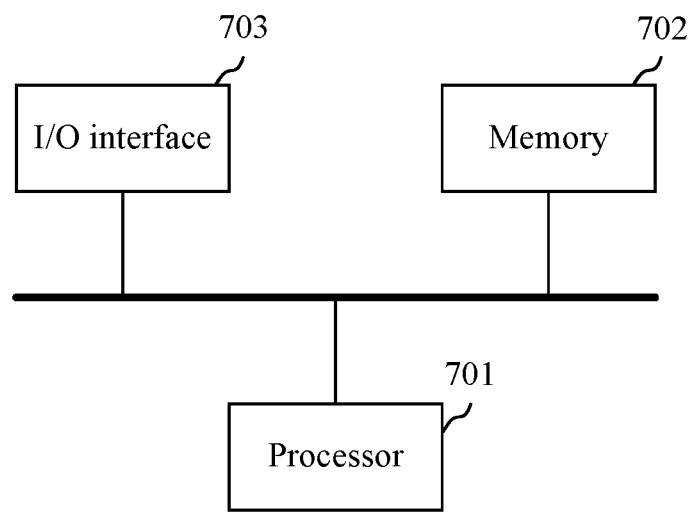
FIG. 7 is a composition block diagram of an electronic device according to an embodiment of the present disclosure.

Referring to FIG. 7, the embodiments of the present disclosure provide an electronic device. The electronic device includes one or more processors 701, a memory 702 and one or more I/O interfaces 703. The memory 702 stores one or more programs, where the one or more programs, when executed by the one or more processors, cause the one or more processors to implement any one of the above methods for updating configuration data of the site. The one or more I/O interfaces 703 are connected between the one or more processors and the memory and configured to implement an information interaction between the one or more processors and the memory.

The processor 701 is a device having a data processing capability, including but not limited to a central processing unit (CPU) or the like. The memory 702 is a device having a data storage capability, including but not limited to a random-access memory (RAM), such as a synchronous dynamic RAM (SDRAM), a double data rate SDRAM (DDR SDRAM), a read-only memory (ROM), an electrically erasable programmable ROM (EEPROM) and a flash memory. The I/O interface (the read-write interface) 703 is connected between the processor 701 and the memory 702 and can implement the information interaction between the processor 701 and the memory 702, including but not limited to a data bus or the like.

In some embodiments, the processor 701, the memory 702 and the I/O interface 703 are connected to each other via a bus and further connected to other components of a computing device.

The embodiments of the present disclosure provide a computer-readable medium, which stores a computer program, where the program, when executed by a processor, implements any one of the above methods for updating configuration data of the site.

All or part of the processes in the method, and function modules/units in the system and apparatus disclosed above may be implemented as software, firmware, hardware and appropriate combinations thereof. In the hardware implementation, the division of the function modules/units in the preceding description may not correspond to the division of physical components. For example, one physical component may have multiple functions, or one function or process may be performed cooperatively by multiple physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed on computer-readable media. The computer-readable media may include computer storage media (or non-transitory media) and communication media (or transitory media). As is known to those of ordinary skill in the art, the term computer storage media includes volatile and nonvolatile media and removable and non-removable media implemented in any method or technology configured to store information (such as computer-readable instructions, data structures, program modules or other data). The computer storage media include, but are not limited to, an RAM, an ROM, an EEPROM, a flash memory or other memory technologies, a compact disc read-only memory (CD-ROM), a digital video disc (DVD) or other optical disc storages, a magnetic cassette, a magnetic tape, a magnetic disk or other magnetic storage devices, or any other medium configured to store desired information and can be accessed by a computer. The communication media generally include computer-readable instructions, data structures, program modules, or other data in carriers or in modulated data signals transported in other transport mechanisms and may include any information delivery medium.

What is claimed is:

1. A method for updating configuration data of a site, comprising:
   according to a managed object (MO) model file of a network management system, parsing data of the site to obtain data information of the site, wherein the data information of the site comprises all MOs in the site and parent-child relationships and reference relationships between the all MOs;
   according to a physical device model file of the network management system, parsing a physical device model of the site to obtain physical device information of the site, wherein the physical device information of the site comprises all physical devices in the site, levels of the all physical devices and an MO instance of at least one physical device of the all physical devices at each level;
   according to a target physical device selected from the all physical devices by a user, the data information of the site and the physical device information of the site, determining an MO instance of the target physical device, an MO instance of a replaceable physical device below a level where the target physical device is located and an MO instance related to a service of the replaceable physical device;
   generating configuration data of the site according to the MO instance of the target physical device, the MO instance of the replaceable physical device below the level where the target physical device is located and the MO instance related to the service of the replaceable physical device; and
   updating the site by using the configuration data of the site;
   wherein determining the MO instance of the replaceable physical device below the level where the target physical device is located according to the target physical device selected from the all physical devices by the user and the physical device information of the site comprises:
   determining, level by level, service types supported by a plurality of levels of physical devices below the level where the target physical device is located according to the target physical device and the physical device information of the site;
   according to the service type supported by each of the plurality of levels of physical devices, determining a type of each of the plurality of levels of physical devices; and
   determining the MO instance of the replaceable physical device below the level where the target physical device is located according to the type of each of the plurality of levels of physical devices.

2. The method according to claim 1, wherein according to the MO model file of the network management system, parsing the data of the site to obtain the data information of the site comprises:
   parsing the data of the site according to the MO model file of the network management system and dividing the data of the site into blocks to obtain an MO in each block and parent-child relationships between the obtained MOs; and
   parsing the data of the site according to the MO model file of the network management system to obtain a reference relationship description keyword, and obtaining an MO instance of a physical device referenced by the all MOs according to the reference relationship description keyword.

3. The method according to claim 1, before generating the configuration data of the site according to the MO instance of the target physical device, the MO instance of the replaceable physical device below the level where the target physical device is located and the MO instance related to the service of the replaceable physical device, further comprising:
   performing legitimacy verification on the replaceable physical device below the level where the target physical device is located; and
   in a case where the replaceable physical device is not legitimate, alerting the user; and
   in a case where the replaceable physical device is legitimate, the process of generating the configuration data of the site according to the MO instance of the target physical device, the MO instance of the replaceable physical device below the level where the target physical device is located and the MO instance related to the service of the replaceable physical device comprises: generating the configuration data of the site according to the MO instance of the target physical device, the MO instance of the replaceable physical device below the level where the target physical device is located and the MO instance related to the service of the replaceable physical device.

4. The method according to claim 3, wherein performing the legitimacy verification on the replaceable physical device below the level where the target physical device is located comprises:
   sequentially verifying a type, a service type and a number of instances of each of a plurality of levels of replaceable physical devices below the level where the target physical device is located to determine the legitimacy of the target physical device.

5. The method according to claim 3, after alerting the user in the case where the replaceable physical device is not legitimate, further comprising:
   replacing the target physical device or modifying the data of the site.

6. The method according to claim 1, wherein updating the site by using the configuration data of the site comprises:

according to the configuration data of the site, creating or replacing the MO instance of the target physical device, replacing an MO instance of a referenced physical device below the level where the target physical device is located and updating an MO instance related to a service of a replaced referenced physical device.

7. The method according to claim 6, wherein updating the MO instance related to the service of the replaced referenced physical device comprises:
    updating an MO instance of the service of the replaced referenced physical device; and
    acquiring an MO referencing the replaced referenced physical device and updating an attribute value of the MO referencing the replaced referenced physical device to an attribute value of the replaced referenced physical device.

8. An electronic device, comprising:
    at least one processor;
    a memory storing at least one program; and
    at least one input/output (I/O) interface, which is connected between the at least one processor and the memory and configured to implement an information interaction between the at least one processor and the memory;
    wherein the at least one program, when executed by the at least one processor, causes the at least one processor to implement:
    according to a managed object (MO) model file of a network management system, parsing data of a site to obtain data information of the site, wherein the data information of the site comprises all MOs in the site and parent-child relationships and reference relationships between the all MOs;
    according to a physical device model file of the network management system, parsing a physical device model of the site to obtain physical device information of the site, wherein the physical device information of the site comprises all physical devices in the site, levels of the all physical devices and an MO instance of at least one physical device of the all physical devices at each level;
    according to a target physical device selected from the all physical devices by a user, the data information of the site and the physical device information of the site, determining an MO instance of the target physical device, an MO instance of a replaceable physical device below a level where the target physical device is located and an MO instance related to a service of the replaceable physical device;
    generating configuration data of the site according to the MO instance of the target physical device, the MO instance of the replaceable physical device below the level where the target physical device is located and the MO instance related to the service of the replaceable physical device; and
    updating the site by using the configuration data of the site;
    wherein the at least one processor is configured to determine the MO instance of the replaceable physical device below the level where the target physical device is located according to the target physical device selected from the all physical devices by the user and the physical device information of the site by:
    determining, level by level, service types supported by a plurality of levels of physical devices below the level where the target physical device is located according to the target physical device and the physical device information of the site;
    according to the service type supported by each of the plurality of levels of physical devices, determining a type of each of the plurality of levels of physical devices; and
    determining the MO instance of the replaceable physical device below the level where the target physical device is located according to the type of each of the plurality of levels of physical devices.

9. The electronic device according to claim 8, wherein according to the MO model file of the network management system, the at least one processor parses the data of the site to obtain the data information of the site by:
    parsing the data of the site according to the MO model file of the network management system and dividing the data of the site into blocks to obtain an MO in each block and parent-child relationships between the obtained MOs; and
    parsing the data of the site according to the MO model file of the network management system to obtain a reference relationship description keyword, and obtaining an MO instance of a physical device referenced by the all MOs according to the reference relationship description keyword.

10. The electronic device according to claim 8, before generating the configuration data of the site according to the MO instance of the target physical device, the MO instance of the replaceable physical device below the level where the target physical device is located and the MO instance related to the service of the replaceable physical device, the at least one processor is further configured to implement:
    performing legitimacy verification on the replaceable physical device below the level where the target physical device is located; and
    in a case where the replaceable physical device is not legitimate, alerting the user; and
    in a case where the replaceable physical device is legitimate, the process of generating the configuration data of the site according to the MO instance of the target physical device, the MO instance of the replaceable physical device below the level where the target physical device is located and the MO instance related to the service of the replaceable physical device comprises:
    generating the configuration data of the site according to the MO instance of the target physical device, the MO instance of the replaceable physical device below the level where the target physical device is located and the MO instance related to the service of the replaceable physical device.

11. The electronic device according to claim 10, wherein the at least one processor performs the legitimacy verification on the replaceable physical device below the level where the target physical device is located by:
    sequentially verifying a type, a service type and a number of instances of each of a plurality of levels of replaceable physical devices below the level where the target physical device is located to determine the legitimacy of the target physical device.

12. The electronic device according to claim 10, after alerting the user in the case where the replaceable physical device is not legitimate, the at least one processor is further configured to implement:
    replacing the target physical device or modifying the data of the site.

13. The electronic device according to claim 8, wherein the at least one processor updates the site by using the configuration data of the site by:

according to the configuration data of the site, creating or replacing the MO instance of the target physical device, replacing an MO instance of a referenced physical device below the level where the target physical device is located and updating an MO instance related to a service of a replaced referenced physical device.

14. The electronic device according to claim 13, wherein the at least one processor updates the MO instance related to the service of the replaced referenced physical device by:
   updating an MO instance of the service of the replaced referenced physical device; and
   acquiring an MO referencing the replaced referenced physical device and updating an attribute value of the MO referencing the replaced referenced physical device to an attribute value of the replaced referenced physical device.

15. A non-transitory computer-readable medium storing a computer program, wherein the computer program, when executed by a processor, implements:
   according to a managed object (MO) model file of a network management system, parsing data of a site to obtain data information of the site, wherein the data information of the site comprises all MOs in the site and parent-child relationships and reference relationships between the all MOs;
   according to a physical device model file of the network management system, parsing a physical device model of the site to obtain physical device information of the site, wherein the physical device information of the site comprises all physical devices in the site, levels of the all physical devices and an MO instance of at least one physical device of the all physical devices at each level;
   according to a target physical device selected from the all physical devices by a user, the data information of the site and the physical device information of the site, determining an MO instance of the target physical device, an MO instance of a replaceable physical device below a level where the target physical device is located and an MO instance related to a service of the replaceable physical device;
   generating configuration data of the site according to the MO instance of the target physical device, the MO instance of the replaceable physical device below the level where the target physical device is located and the MO instance related to the service of the replaceable physical device; and
   updating the site by using the configuration data of the site;
   wherein the processor is configured to determine the MO instance of the replaceable physical device below the level where the target physical device is located according to the target physical device selected from the all physical devices by the user and the physical device information of the site by:
   determining, level by level, service types supported by a plurality of levels of physical devices below the level where the target physical device is located according to the target physical device and the physical device information of the site;
   according to the service type supported by each of the plurality of levels of physical devices, determining a type of each of the plurality of levels of physical devices; and
   determining the MO instance of the replaceable physical device below the level where the target physical device is located according to the type of each of the plurality of levels of physical devices.

* * * * *